United States Patent [19]
Kubo et al.

[11] Patent Number: 5,298,200
[45] Date of Patent: Mar. 29, 1994

[54] DENTAL REFRACTORY MODEL MATERIALS

[75] Inventors: Fuminobu Kubo, Katano; Hiroyuki Hino, Ichinomiya; Tsutomu Shibata, Funabashi, all of Japan

[73] Assignees: G-C Dental Industrial Corp., Tokyo; Taisei Dental Mfg. Co., Ltd., Osaka, both of Japan

[21] Appl. No.: 76,688

[22] Filed: Jun. 15, 1993

Related U.S. Application Data

[63] Continuation of Ser. No. 825,316, Jan. 27, 1992, abandoned, which is a continuation of Ser. No. 560,274, Jul. 30, 1990, abandoned, which is a continuation of Ser. No. 271,445, Nov. 15, 1988, abandoned.

[30] Foreign Application Priority Data

Nov. 18, 1987 [JP] Japan .................................. 62-289604

[51] Int. Cl.⁵ .................... A61C 5/10; A61C 13/00; A61C 13/083
[52] U.S. Cl. .................................. 264/16; 106/35; 264/19; 264/20; 264/222; 433/202.1; 433/203.1; 433/222.1
[58] Field of Search .............................. 106/35, 38.3; 433/199.1, 213, 202.1, 48, 214, 215, 222.1; 264/19, 20, 16, 222

[56] References Cited

U.S. PATENT DOCUMENTS

| | | | |
|---|---|---|---|
| 2,314,626 | 3/1943 | Neiman | 106/38.3 |
| 3,473,599 | 10/1969 | Rose | 106/38.3 |
| 3,617,315 | 11/1971 | Vickery | 106/38.3 |
| 3,923,534 | 12/1975 | Cassidy | 501/111 |
| 4,243,420 | 1/1981 | Sakai | 106/38.3 |
| 4,591,385 | 5/1986 | Pearsall | 106/38.3 |
| 4,814,011 | 3/1989 | Kamohara | 501/1 |
| 4,909,847 | 3/1990 | Ohi | 433/199.1 |
| 4,911,759 | 3/1990 | Ohi | 433/199.1 |
| 5,013,363 | 5/1991 | Hakamatsuka | 106/38.3 |

FOREIGN PATENT DOCUMENTS

| | | |
|---|---|---|
| 3445848 | 6/1986 | Fed. Rep. of Germany . |
| 536857 | 5/1941 | United Kingdom . |
| 2198125 | 6/1988 | United Kingdom . |

OTHER PUBLICATIONS

Kirk-Othmer *Encyclopedia of Chemical Technology,* Third Edition, vol. 7, John Wiley and Sons, Jul. 12, 1988, pp. 471–2.

*Primary Examiner*—Linda Skaling
*Assistant Examiner*—John Boyd
*Attorney, Agent, or Firm*—Oblon, Spivak, McClelland, Maier & Neustadt

[57] ABSTRACT

A dental refractory model material comprises as powdery components 5 to 20% by weight of a soluble phosphate, 5 to 20% by weight of magnesium oxide and 10 to 50% by weight of at least one selected from the group of alumina, zirconia, fused quartz, mullite, spinel and cordierite with the balance being crystalline quartz and crystobalite. The refractory model material also includes a liquid component such as a colloidal silica dispersion.

5 Claims, 3 Drawing Sheets

DENTAL REFRACTORY MODEL MATERIALS

This application is a continuation of application Ser. No. 07/825,316, filed on Jan. 27, 1992, now abandoned, which is a continuation of application Ser. No. 07/560,274, filed on Jul. 30, 1990, now abandoned, which is a continuation of application Ser. No. 07/271,445, filed on Nov. 15, 1988, now abandoned.

BACKGROUND OF THE INVENTION

1. Field of the Invention

The present invention relates to a refractory model material for making dental porcelain restoratives by a building-up method. More specifically, the present invention concerns a dental refractory model material usable for dental porcelain restoratives such as porcelain laminated veneers, porcelain inlays or onlays and porcelain jacket crowns by taking an impression of formed teeth in the mouth with the use of a dental impression material, casting a blend of a powdery component with a colloidal silica dispersion into the impression as a slurry slush, which is then cured to prepare a refractory model, and building a finely divided porcelain slush directly upon the model, which is then placed in a furnace, etc. in its entirety to heat and burn the porcelain.

2. Statement of the Prior Art

Heretofore, refractory model materials based on phosphates and gypsum have been used as the refractory model materials for preparing dental porcelain restoratives such as porcelain laminated veneers. Soluble phosphates and magnesium oxide or gypsum have been used as the binding component therefor, and crystalline quartz and crystobalite as the aggregate component therefor. For the phosphate base refractory model materials, a colloidal silica dispersion has been used as a liquid component.

However, such conventional refractory model materials have had the following defects.

(1) Crystalline quartz and crystobalite incorporated as the main component of an aggregate undergo a sharp volume change due to crystal transformation in the vicinity of 573° C. and 200°–300° C., respectively. With the conventional refractory model materials, it has thus been pointed out that since it is impossible to control sharp changes in the thermal expansion of crystalline quartz and crystobalite, crazing or cracking problems arise, when models are repeatedly burned.

(2) Sharp changes in the volume of the refractory model materials give rise to the distortion of built-up porcelain during burning, thus causing the porcelain to be cracked.

(3) Even though the mixing ratio of crystalline quartz and crystobalite used as the main component of the aggregate is varied, the conventional refractory model materials show only a slight variation in the rate of changes in heating. Thus, it is difficult to accommodate them to various types of commercially available porcelain having varied rates of changes in heating.

(4) When models are prepared and removed from impression materials, it is most likely that they may be fractured due to a low green strength of the refractory model materials.

(5) When a finely divided porcelain slush is condensed during building-up, it is most likely that the surfaces of models may be damaged by a condensing instrument by reason of a strength after burning with nothing placed thereon (hereinafter referred to as a post-burning strength) being low. The conventional model materials are also short of reasonable durability.

(6) In some cases, the conventional model materials may cause surface roughening of impressions, failing to provide smooth model surfaces. Thus, some difficulty is involved in precise dental manipulations.

SUMMARY OF THE INVENTION

An object of the present invention is to obtain a dental refractory model material which eliminates the aforesaid disadvantages of conventionally available refractory materials, and provides a dental refractory model which does not undergo any sharp change upon heated due to a volume change owing to the crystal transformation of an aggregate component, describes a curve of changes in heating approximating to that of the porcelain used, is not virtually subjected to cracking during repeated burning, and has a green strength and a post-burning strength which are so high that it is unlikely for the porcelain to be fractured and abraded. This makes it possible for dental technicians to prepare dental porcelain restoratives such as porcelain laminated veneers, porcelain inlays or onlays and porcelain jacket crowns in a sound manner without any failure such as cracking.

BRIEF DESCRIPTION OF THE DRAWINGS

In FIG. 1, 1-$a$ shows a curve of changes in heating of commercially available porcelain having a rate of changes in heating of 1.0% and 1-$b$, a curve of changes in heating in Comparative Example 1; in FIG. 2, 2-$a$ shows a curve of changes in heating of commercially available dental porcelain having a rate of changes in heating of 1.0% and 2-$b$, a curve of changes in heating in Example 2; and in FIG. 3, 3-$a$ shows a curve of changes in heating of commercially available dental low-melting porcelain having a rate of changes in heating of 0.6% and 3-$b$, a curve of changes in heating in Example 6.

DETAILED DESCRIPTION OF THE INVENTION

Figure 1:
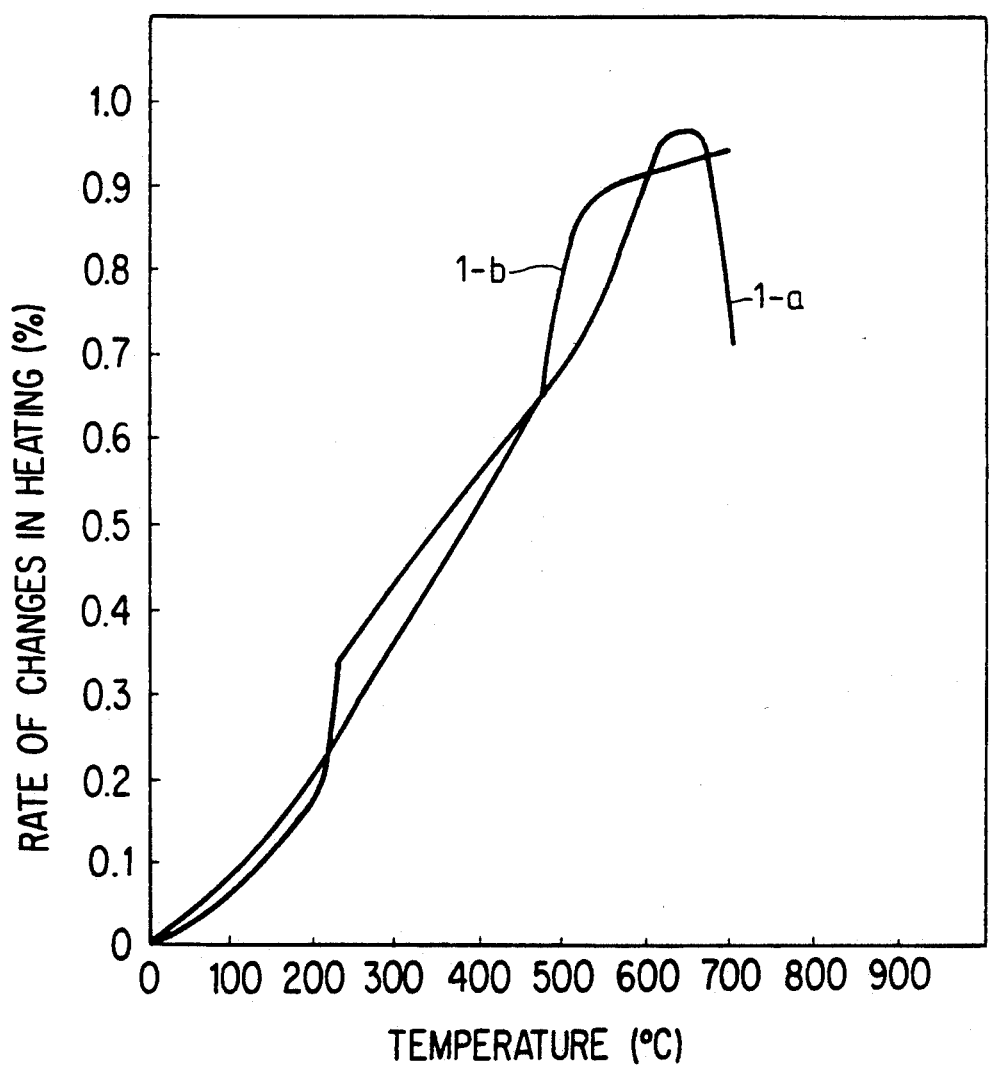
FIGS. 1 to 3 illustrate curves of changes in heating.

The present invention is characterized in that the following means are taken so as to solve the aforesaid problems and attain the aforesaid object. More specifically, crystalline quartz or crystobalite that is a main component of the aggregate of the conventional refractory model materials is partly or entirely substituted by an inorganic material which is used as an aggregate component in powdery components and shows no volume change upon heated due to crystal transformation, thereby obtaining a composition which reduces a sharp changes in heating of a refractory model material and, hence, describes a substantially linear curve changes in heating. As the inorganic materials showing no volume change due to crystal transformation by heating when heated from normal temperature to 1,000° C., preferably to 1,200° C., use may be made of at least one of inorganics such as alumina, zirconia, fused quartz, mullite, spinel and cordierite which are found to show no sharp volume change due to crystal transformation and describe a substantially linear curve of changes in heating. Contents of such inorganics short of 10% and exceeding 90% are impractical, since it is difficult to limit a sharp volume change due to the crystal transformation of crystalline quartz and cristobalite in an amount of below 10%, whereas there is a lowering of strength in an amount of higher than 90% because the amount of magnesium oxide and a soluble phosphate to be mixed, which are main components of a binder, are correspondingly decreased. Thus, the content of the inorganic materials showing no volume change upon heated due to crystal transformation is limited to a range of 10% to 90%.

The binder serves to improve the green and post-burning strength of dental refractory model materials. However, a refractory model material having a magnesium oxide content of 5% or less is so poor in the green strength that it is likely to be fractured, when removed from an impression material. When the content of magnesium oxide to be mixed exceeds 20%, on the other hand, certain improvements in the green and post-burning strength are only achieved in spite of rises in the cost incurred. Thus, the content of magnesium oxide is limited to a range of 5% to 20%. Use of the soluble phosphate by 5% or less makes no attribution to increases in the green strength of a refractory model material, and is thus likely to be fractured, when removed from an impression material, whereas the use of the soluble phosphate by 20% or more gives rise to increases in the amount of contraction of a dental model after burned with nothing placed thereon, which thus becomes impractical. Accordingly, the content of the soluble phosphate is limited to a range of 5% to 20%.

A colloidal silica dispersion used as a blending liquid serves to improve the strength of a dental refractory model material, regulate the curing expansion thereof and make up for the burning contraction thereof during burning with nothing placed thereon. Thus, it is possible to adjust the strength and curing expansion of a dental refractory model material by varying the silica concentration of the colloidal silica dispersion. When the silica concentration is 10% or less, however, improvements in both strength and curing expansion are so reduced that a refractory model material may possibly be fractured, when removed from an impression material, and the burning contraction thereof during burning with nothing placed thereon cannot be made up for. When the silica concentration exceeds 40%, on the other hand, improvments in strength are not achieved probably because of the gelling of the colloidal silica dispersion occurring preferentially and there is also a rise in the cost. Hence, the silica concentration is limited to 10% at the minimum and 40% at the maximum, preferably to a range of 20% to 35%.

The following actions are attained by the means as mentioned above.

(1) In the refractory model materials according to the present invention, crystalline quartz and crystobalite that are the aggregate component of conventional refractory model materials are replaced by varied amounts of at least one of the inorganic materials selected from the group consisting of alumina, zirconia, fused quartz, mullite, spinel, cordierite, phorstelite, stellerite, silicon carbide, silicon nitride, calcia and titanium oxide to reduce or substantially avoid a volume change attributable to the crystal transformation of crystalline quartz and crystobalite. Thus, there is no fear that the refractory model material may be cracked by repeated burning.

(2) It is also very unlikely that when porcelain is built upon and burned on the refractory model material, the porcelain may be cracked due to a sharp volume change thereof.

(3) The rate of changes in heating of the refractory model material after burning with nothing placed thereon can arbitrarily be varied by the proportion of the incorporated inorganic materials showing no volume change upon heated due to crystal transformation. Further, since alumina, zirconia, fused quartz, mullite, spinel, cordierite, phorstelite, stellerite, silicon carbide, silicon nitride, calcia and titanium oxide, which are inorganic materials describing a substantially linear curve of changes in heating, are different from one another in the quantities of changes in heating, it is also possible to arbitrarily vary the rate of changes in heating of the refractory model material by varying the type of such inorganic materials. Thus, the refractory model material can be accommodated to commercially available porcelain products having various rates of changes in heating.

(4) Of the aforesaid inorganic materials, alumina and zirconia have specific weights larger than those of crystallite quartz and crystobalite. Thus, when the refractory model material is kneaded into a slurried state, the proportion of the liquid component to be kneaded with the powdery component can be decreased, whereby the green strength of the refractory model material can be increased with no fear of fracturing, when a model is prepared and then removed from an impression material.

(5) The post-burning strength of the refractory model material can also be so increased that, when condensing is effected during the building-up of procelain, it is unlikely that a model may be damaged on its surface by a condensing instrument. The refractory model material can also be so increased in durability that it undergoes little or no fracturing and abrading.

(6) Since any surface roughening of an impression material can be substantially avoided by decreasing the proportion of the liquid component to be kneaded with the powdery component, it is possible to obtain a model surface so smooth that precise dental manipulations can be performed.

EXAMPLES

The present invention will now be explained in more detail with reference to the following examples which are given for the purpose of illustration alone and without any intention of limiting the present invention.

In the examples and comparative examples to follow, the powdery components used were weighed in the proportions as specified in a table to be given later, mixed together in a blender for 20 minutes, and were thereafter passed through an 100-mesh sieve.

In the preparation of samples, the proportion of the liquid component to be blended with the powdery component was determined by kneading 100 g of a powdery component sample with varied amounts of water in a room regulated to a temperature of 20° to 25° C. at a kneading rate of 370 rpm for 60 seconds according to JIS T 6601 [Investment Materials for Dental Casting] with the use of a vaccum kneader ordinarily used for the kneading of dental investment materials, filling the thus kneaded refractory model material slush into a cylindrical mold of a metal and of 28 mm in inner diameter and 50 mm in height placed on a glass plate, gradually pulling up the mold two minutes after the initiation of kneading while leaving the refractory model material slush alone and measuring the maximum and minimum diameters of a portion of the refractory model material in contact with the glass plate in further one minute.

Said determination of the proportion of the liquid component to be blended with the powdery component was made on the basis of the amount of water to be mixed which is defined by the standard consistency, as expressed in terms of an averaged measurement of 55 to 60 mm.

Crushing strength testing was performed according to the crushing strength test method of JIS T 6601. That is, a sample kneaded to the standard consistency was filled in a cylindrical mold of a metal and of 30 mm in inner diameter and 60 mm in height, in which it was cured to a degree sufficient to resist to handling. Afterwards, the sample was removed from within the mold, and was then allowed to stand at room temperature. Twenty-four (24) hours after the initiation of kneading, the sample was compressed at a compression rate of 1 mm/min. according to the compression testing method to obtain a crushing strength value of the refractory model material.

For the determination of the post-burning strength, a sample was prepared in a similar manner as mentioned above. The sample was subsequently heated from 700° C. to 1000° C. at a heating rate of 50° C./min. in a dental electric furnace, maintained at that temperature for 10 minutes, cooled down to room temperature, and was finally tested according to the compression testing method.

For the determination of the rate of curing expansion, a sample kneaded to the standard consistency was put upon a wax paper laid down on the inner surface of a metal tray, as provided by the expansion-upon-solidification testing of JIS T 6601. The sample was flattened on the surface and provided with metal foil marks at an interval of 50 mm. Two (2) minutes after the initiation of kneading, a distance between the marks was measured and, 30 minutes after the initiation of kneading, that distance was again measured to determine the rate of expansion with respect to the original distance measurement. The measurement of the mark to mark distance was measured with a measuring machine having a precision of 1/100 mm or higher.

For the determination of the rate of changes in heating, a sample kneaded to the standard consistency was filled in a metallic cylindrical mold of 10 mm in inner diameter and 50 mm in height according to the thermal expansion testing of JIS T 6601, in which it was cured to a degree sufficient to resist to handling. The sample was removed from within the mold and, 1 hour after the initiation of kneading, it was heated from 700° C. to 1000° C. at 50° C. per minute in a dental electric furnace, maintained at 1000° C. for 10 minutes, and was cooled down to room temperature. Thereafter, the temperature of the furnace was increased by a measuring apparatus of fused quartz to about 1000° C. over three hours to measure a length change for each 100° C. increase, thereby determining the rate of length change with respect to the original length.

Whether the refractory model material was cracked or not was measured in the following manner. A sample prepared in a similar manner as described in connection with the crushing strength testing was immersed and held in water until the sample did not give off air bubbles. The sample was sufficiently dried in front of an inlet of a dental electric furnace, in which it was then heated from 700° C. to 1000° C. at 50° C. per minute, maintained at 1000° C., for 10 minutes and was cooled down to room temperature. After this cylce was repeated five times, the sample was visually observed in terms of whether it was cracked or not.

For the determination of whether porcelain was cracked or not, a sample prepared in a similar manner as described in connection with the crushing strength testing was heated from 700° C. to 1000° C. at 50° C. per minute, maintained at 1000° C. for 10 minutes, and was cooled down to room temperature. Afterwards, the sample was immersed in water and allowed to stand therein until it did not give off air bubbles. A slush of finely divided porcelain was built upon a side of the sample in the form of a layer of about 10 mm × 10 mm × 0.2 mm, which was sufficiently dried in front of an inlet of a dental electric furnace, heated therein from 700° C. to 920° C. at 50° C. per minute under a vaccum of 720 mmHg, maintained at 920° C. for 2 minutes, and was finally cooled down to room temperature. After this cycle was repeated three times, the sample was visually evaluated in terms of whether or not the porcelain was cracked.

For the determination of the surface smoothness of the model, a sample used for the cracking test of the refractory model material was used with a contact type surface-roughness measuring machine, and was measured in terms of an averaged value of ten points.

All the colloidal silica dispersions used as the liquid component in Examples 1 to 13 and Comparative Examples 1 to 6 were regulated to a silica concentration of 35%. The results are set out in Table 1. With the colloidal silica dispersions having a varied silica concentration, the results are also set out in Table 2.

TABLE 1

| | Example 1 | Example 2 | Example 3 | Example 4 | Example 5 | Example 6 | Example 7 |
|---|---|---|---|---|---|---|---|
| Composition (% by Weight) | | | | | | | |
| Binder | | | | | | | |
| Monoammonium Phosphate | 9.0 | 10.0 | 17.0 | 10.0 | 7.0 | 10.0 | 10.0 |
| Magnesium Oxide | 11.0 | 10.0 | 17.0 | 10.0 | 7.0 | 10.0 | 10.0 |
| Aggregate | | | | | | | |
| Crystalline Quartz | 52.5 | 46.0 | 38.0 | 46.0 | 49.5 | | |
| Crystobalite | 7.5 | 7.0 | 5.0 | 7.0 | 7.5 | | |
| Inorganic materials showing no volume change due to crystal transformation by heating. | | | | | | | |
| Alumina | 20.0 | 27.0 | 23.0 | 13.0 | 29.0 | 80.0 | 70.0 |
| Fused Quartz | | | | | | | 10.0 |
| Zirconia | | | | 14.0 | | | |
| Mullite | | | | | | | |
| Spinel | | | | | | | |
| Cordierite | | | | | | | |

TABLE 1-continued

|  | | | | | | | |
|---|---|---|---|---|---|---|---|
| Standard Liquid Amount (ml) | 17.0 | 17.0 | 18.0 | 17.0 | 16.0 | 14.0 | 16.0 |
| Rate of Changes in Heating (%) | 0.83 | 0.80 | 0.87 | 0.81 | 0.78 | 0.55 | 0.50 |
| Crushing Strength (MPa) | | | | | | | |
| Green Strength (after 24 hours) | 38.4 | 45.0 | 37.6 | 46.0 | 34.4 | 58.2 | 40.5 |
| Post-Burning Strength | 34.6 | 41.3 | 35.4 | 42.3 | 32.2 | 52.9 | 38.5 |
| Cracking in Model Materials | Not Caused | Not Caused | Not Caused | Not Caused | Not Caused | Not Caused | Not Caused |
| Cracking of Porcelain (Rate of Changes in Heating of Used porcelain) | Not Caused (1.0%) | Not Caused (1.0%) | Not Caused (1.0%) | Not Caused (1.0%) | Not Caused (1.0%) | Not Caused (0.6%) | Not Caused (0.6%) |
| Surface Roughness of Model Material (μm) | 6.5 | 5.5 | 6.8 | 4.7 | 7.0 | 3.5 | 5.2 |

|  | Example 8 | Example 9 | Example 10 | Example 11 | Example 12 | Example 13 | Comparative Example 1 |
|---|---|---|---|---|---|---|---|
| Composition (% by Weight) | | | | | | | |
| Binder | | | | | | | |
| Monoammonium Phosphate | 10.0 | 11.0 | 10.0 | 10.0 | 10.0 | 10.0 | 10 |
| Magnesium Oxide | 10.0 | 9.0 | 10.0 | 10.0 | 10.0 | 10.0 | 10 |
| Aggregate | | | | | | | |
| Crystalline Quartz | 36.0 | 45.0 | 52.5 | 52.5 | 35.0 | | 70.0 |
| Crystobalite | 4.0 | 5.0 | 7.5 | 7.5 | 5.0 | | 10.0 |
| Inorganic materials showing no volume change due to crystal transformation by heating. | | | | | | | |
| Alumina | 20.0 | 15.0 | | 10.0 | | 60.0 | |
| Fused Quartz | | | | | | | |
| Zirconia | 20.0 | 15.0 | | | 25.0 | | |
| Mullite | | | 20.0 | | | | |
| Spinel | | | | 10.0 | | | |
| Cordierite | | | | | 15.0 | 20.0 | |
| Standard Liquid Amount (ml) | 17.0 | 17.0 | 18.0 | 18.0 | 18.0 | 17.0 | 19.0 |
| Rate of Changes in Heating (%) | 0.80 | 0.81 | 0.85 | 0.86 | 0.80 | 0.51 | 0.95 |
| Crushing Strength (MPa) | | | | | | | |
| Green Strength (after 24 hours) | 46.4 | 43.2 | 36.5 | 35.4 | 40.1 | 51.2 | 28.7 |
| Post-Burning Strength | 44.2 | 41.5 | 35.1 | 33.2 | 38.9 | 50.4 | 28.4 |
| Cracking in Model Materials | Not Caused | Not Caused | Not Caused | Not Caused | Not Caused | Not Caused | Caused |
| Cracking of Porcelain (Rate of Changes in Heating of Used porcelain) | Not Caused (1.0%) | Not Caused (1.0%) | Not Caused (1.0%) | Not Caused (1.0%) | Not Caused (1.0%) | Not Caused (0.6%) | Caused (1.0%) |
| Surface Roughness of Model Material (μm) | 4.3 | 4.7 | 7.0 | 6.8 | 5.0 | 5.1 | 10.0 |

|  | Comparative Example 2 | Comparative Example 3 | Comparative Example 4 | Comparative Example 5 | Comparative Example 6 |
|---|---|---|---|---|---|
| Composition (% by Weight) | | | | | |
| Binder | | | | | |
| Monoammonium Phosphate | 3.0 | 6.0 | 25.0 | 15.0 | 10.0 |
| Magnesium Oxide | 6.0 | 3.0 | 15.0 | 25.0 | 10.0 |
| Aggregate | | | | | |
| Crystalline Quartz | 76.0 | 76.0 | 50.0 | 50.0 | 64.0 |
| Crystobalite | 15.0 | 15.0 | 10.0 | 10.0 | 7.0 |
| Inorganic materials showing no volume change due to crystal transformation by heating. | | | | | |
| Alumina | | | | | 9.0 |
| Fused Quartz | | | | | |
| Zirconia | | | | | |
| Mullite | | | | | |
| Spinel | | | | | |
| Cordierite | | | | | |
| Standard Liquid Amount (ml) | 19.0 | 19.0 | 20.0 | 21.0 | 19.0 |
| Rate of Changes in Heating (%) | 0.91 | 0.90 | 0.93 | 0.92 | 0.90 |
| Crushing Strength (MPa) | | | | | |
| Green Strength (after 24 hours) | 19.7 | 18.6 | 28.9 | 26.7 | 30.4 |
| Post-Burning Strength | 17.3 | 17.4 | 28.4 | 27.1 | 29.9 |
| Cracking in Model Materials | Caused | Caused | Caused | Caused | Caused |
| Cracking of Porcelain (Rate of Changes in Heating of Used porcelain) | Caused (1.0%) | Caused (1.0%) | Caused (1.0%) | Caused (1.0%) | Caused (1.0%) |

| | | | | | |
|---|---|---|---|---|---|
| Surface Roughness of Model Material (μm) | 10.2 | 10.0 | 9.9 | 11.3 | 7.3 |

TABLE 1-continued

TABLE 2

| | Example 14 | Example 15 | Example 16 | Example 17 |
|---|---|---|---|---|
| Composition (% by Weight) | | | | |
| Binder | | | | |
| Monoammonium Phosphate | 10 | 10 | 10 | 10 |
| Magnesium Oxide | 10 | 10 | 10 | 10 |
| Aggregate | | | | |
| Crystalline Quartz | 50 | 50 | 50 | 50 |
| Crystobalite | 7 | 7 | 7 | 7 |
| Inorganic materials showing no volume change due to crystal transformation by heating. | | | | |
| Alumina | 23 | 23 | 23 | 23 |
| Standard Liquid Amount (ml) | 17.0 | 17.0 | 17.0 | 17.0 |
| Rate of Curing Expansion (%) | 0.20 | 0.41 | 1.18 | 2.60 |
| Rate of Changes in Heating (%) | 0.80 | 0.82 | 0.83 | 0.88 |
| Crushing Strength (MPa) | | | | |
| Green Strength (after 24 hours) | 35.1 | 38.2 | 49.2 | 34.9 |
| Post-Burning Strength | 32.2 | 35.0 | 36.1 | 34.2 |
| Silica Concentration of Collidal Silica Dispersion (%) | 10 | 20 | 30 | 40 |

Referring to the refractory model materials which are not mixed with the inorganic material showing no volume change due to crystal transformation by heating (Comparative Examples 1 to 5) and replaced by lower than 10% of the inorganic material (Comparative Example 6), their volume changes by heating are increased so sharply that they are crazed or otherwise cracked, or they are distorted or cracked during burning, when porcelain for metal burning (the rate of changes in heating: 1.0%) is built thereupon, as can clearly be understood from Tables 1 and 2. The curve of changes in heating of the porcelain for metal burning having a rate of changes in heating of 1.0% is shown by 1-a in FIG. 1, and the curve of changes in heating of a refractory model material describing that approximating to that of this porcelain may be shown by 1-b in FIG. 1, which corresponds to that of the composition of Comp. Ex. 1. However, this material undergoes a sharp changes in heating due to the crystal transformation of crystalline quartz and crystobalite, having troubles such as the occurrence of cracks. The refractory model material is also poor in both green strength and post-burning strength so that it may be fractured when removed from an impression material, or it may be broken or abraded when porcelain is built thereupon.

Figure 2:
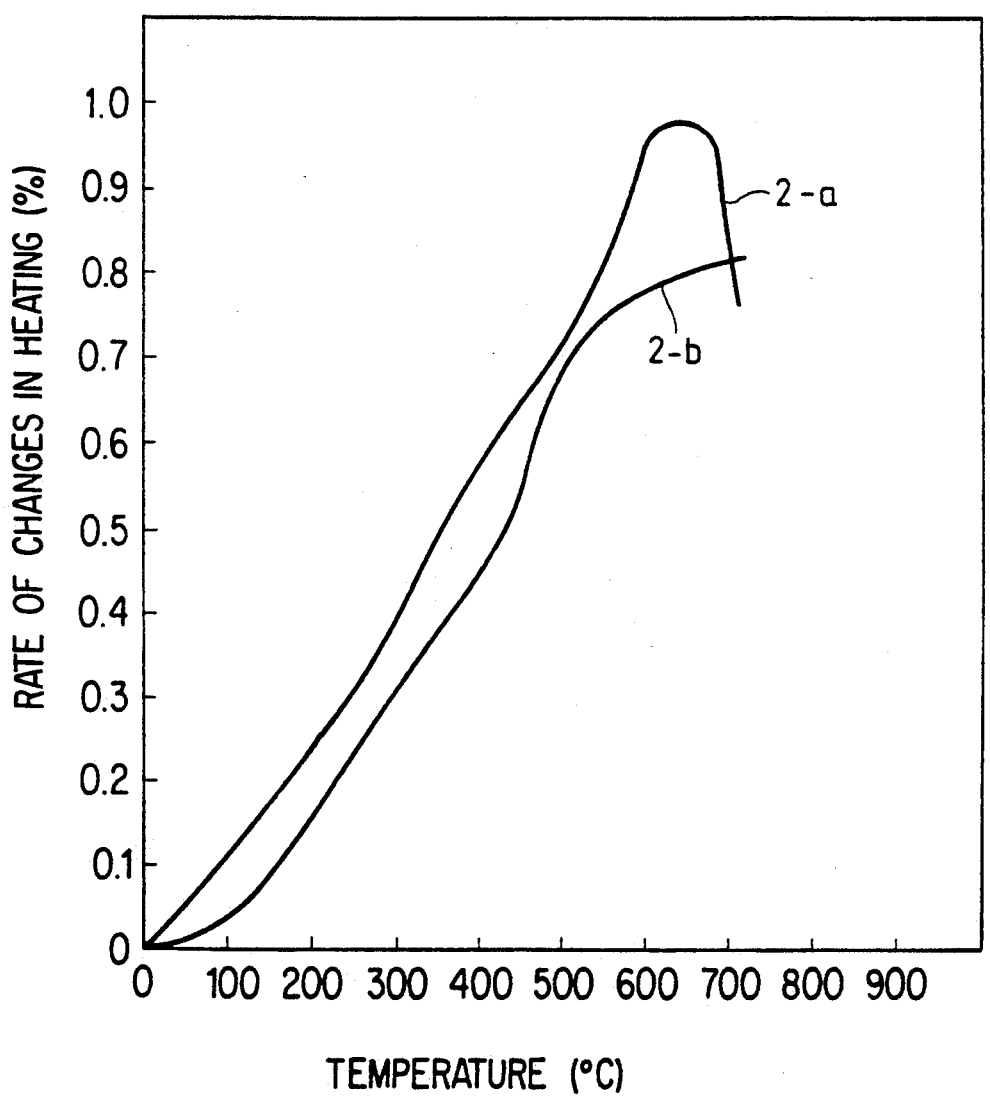

Referring to the refractory model materials (Examples 1, 2, 3, 4, 5, 8, 9, 10, 11 and 12) wherein the amount of substitution of the inorganic materials showing no volume change due to crsytal transformation by heating is 10% to 90%, on the contrary, there is observed less sharp volume change due to heating. This means that the models are neither crazed nor cracked, or porcelain for metal burning is neither distorted nor cracked during burning, when bulit-up. The curve of changes in heating of the refractory model material having a composition of Ex. 2 is shown by 2-b in FIG. 2, which is of a higher linearity and bears resemblance to that of the porcelain for metal burning, shown by 2-a in FIG. 2. Thus, there is caused no cracking or any other trouble.

Referring to the refractory model materials (Examples 6, 7 and 13) wherein the aggregate component is wholly replaced by the inorganic materials showing no volume change due to crystal transformation by heating, they show a decreased rate of changes in heating and describes a curve of changes in heating that is more linear. Thus, low-melting porcelain (having a rate of changes in heating of 0.6%) may be used with such model materials.

Figure 3:
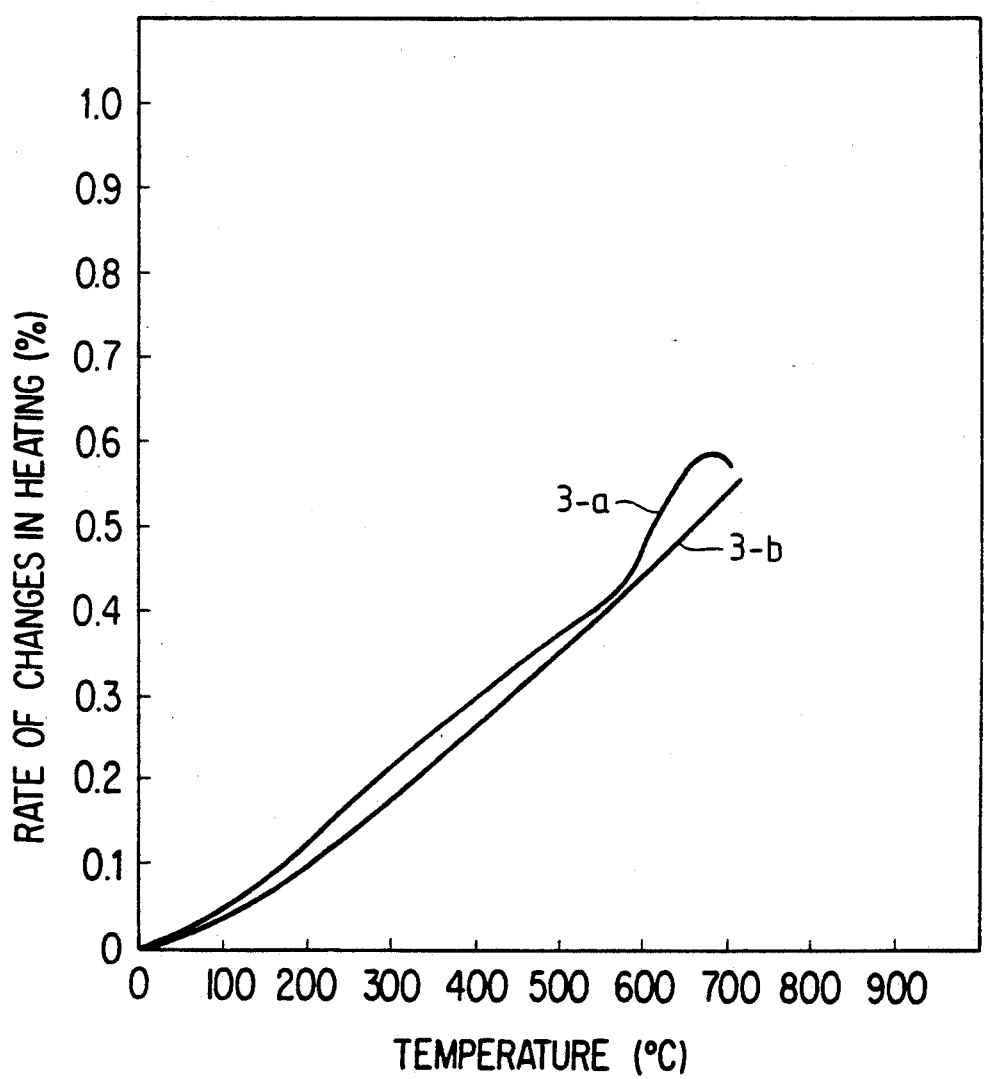

The rate of changes in heating of the model material (Example 6) wherein the aggregate component is wholly replaced by alumina is shown in FIG. 3. 3-a refers to the curve of changes in heating of commercially available low-melting porcelain having a rate of changes in heating of 0.6%, and 3-b to that curve of changes in heating in Ex. 6. When it is desired to obtain a rate of changes in heating lower than that defined by the curve of changes in heating according to Ex. 6, the aggregate components may further be replaced by fused quartz and cordierite (Examples 7 and 13).

By replacing a part or the whole of the aggregate components crystalline quartz and crystobalite by the inorganic materials showing no volume change due to crystal transformation by heating, the refractory model materials are increased in both the green strength and the post-burning strength. It is thus unlikely that they may be fractured when removed from an impression material, or they may be broken or abraded during porcelain building-up. Further, it is possible to improve the surface roughness of the model materials and, hence, obtain smooth model surfaces (Examples 1, 2, 3, 4, 5, 6, 7, 8, 9, 10, 11, 12 and 13).

With the dental refractory model materials of the present invention as detailed above, precise dental operations are feasible. This is because, by replacing the aggregate components crystalline quartz and crystobalite by at least one of the inorganic materials showing no volume change due to crystal transformation by heating, (1) models obtained from the model materials are neither crazed nor cracked even upon subjected to repeated burning, (2) built-up porcelain is neither distorted nor cracked during burning, (3) the model materials are applicable to commercially available dental porcelain products having various rates of changes in heating by regulating their rates of changes in heating, (4) the model materials are so improved in terms of the green strength that they may not be fractured, when removed from an impression material, (5) the model materials are so improved in terms of the post-burning strength that their durability is increased with no fear of breaking or abrading, and (6) the model materials are so improved in terms of the surface roughness that smooth model surfaces are obtainable.

Thus, the dental refractory model materials of the present invention are applicable to the preparation of dental porcelain restoratives such as porcelain laminated veneers, porcelain inlays or onlays and porcelain jacket crowns, and ensure sound dental manipulations.

What is claimed is:

1. A process for making dental porcelain restoratives by a building-up method which comprises casting a dental refractory model material within an impression of formed teeth, said dental refractory model material comprising a component of 5–20% by weight of a soluble phosphate and 5–20% by weight of magnesium oxide, the balance of said component being at least one selected from the group consisting of alumina, zirconia, fused quartz, mullite, spinel and cordierite, curing to prepare a refractory model, building a finely divided porcelain slush directly upon the model, and placing in a furnace to burn the porcelain.

2. The process of claim 1, wherein crystalline quartz and crystobalite are mixed with said component.

3. The process of claim 1, wherein the component consists of 5 to 20% by weight of a soluble phosphate, 5 to 20% by weight of magnesium oxide and 10 to 50% by weight of at least one selected from the group consisting of alumina, zirconia, fused quartz, mullite, spinel and cordierite, the balance of said component being crystalline quartz and crystobalite.

4. The process of claim 2, wherein the component consists of 5 to 20% by weight of a soluble phosphate, 5 to 20% by weight of magnesium oxide and 10 to 50% by weight of at least one selected from the group consisting of alumina, zirconia, fused quartz, mullite, spinel and cordierite, the balance of said component being crystalline quartz and crystobalite.

5. The process of claim 1, wherein said component is admixed with a further liquid component consisting of a colloidal silica dispersion.

* * * * *